United States Patent
Jung et al.

(10) Patent No.: US 11,665,540 B1
(45) Date of Patent: May 30, 2023

(54) METHOD FOR GENERATING BLUETOOTH NETWORK AUTHENTICATING THROUGH AUTHENTICATION CODE GENERATED BASED ON POST-QUANTUM CRYPTOGRAPHY AND BLUETOOTH NETWORK OPERATING SYSTEM PERFORMING SAME

(71) Applicant: NORMA Inc., Seoul (KR)

(72) Inventors: Hyunchul Jung, Seoul (KR); Chang Nyoung Song, Seoul (KR)

(73) Assignee: NORMA Inc., Seoul (KR)

( * ) Notice: Subject to any disclaimer, the term of this patent is extended or adjusted under 35 U.S.C. 154(b) by 0 days.

(21) Appl. No.: 18/080,691

(22) Filed: Dec. 13, 2022

(30) Foreign Application Priority Data

Sep. 1, 2022 (KR) .................. 10-2022-0110909

(51) Int. Cl.
*H04W 12/0431* (2021.01)
*H04W 12/069* (2021.01)
*H04W 12/0433* (2021.01)

(52) U.S. Cl.
CPC ... *H04W 12/0431* (2021.01); *H04W 12/0433* (2021.01); *H04W 12/069* (2021.01)

(58) Field of Classification Search
CPC .................. H04W 12/0431; H04W 12/0433
See application file for complete search history.

(56) References Cited

U.S. PATENT DOCUMENTS

| | | | |
|---|---|---|---|
| 9,374,369 B2 * | 6/2016 | Mahaffey | G06F 21/6245 |
| 10,708,777 B2 * | 7/2020 | Kim | H04W 12/04 |
| 11,381,970 B2 * | 7/2022 | Revadigar | H04L 63/0442 |
| 11,582,607 B2 * | 2/2023 | Mastenbrook | G06K 7/1417 |
| 2016/0012465 A1 * | 1/2016 | Sharp | G06Q 20/321 |
| | | | 705/14.17 |
| 2019/0394025 A1 * | 12/2019 | Maim | G06F 21/72 |
| 2020/0302432 A1 * | 9/2020 | Rule | G06Q 20/4014 |

(Continued)

FOREIGN PATENT DOCUMENTS

KR 1020220012851 A 2/2022

OTHER PUBLICATIONS

Yu-Jin Yang et al., Proposal of Bluetooth model with Post-Quantum Cryptography, Thesis at the Fall Conference of the Korea Information Processing Society, Nov. 4, 2021.

*Primary Examiner* — Viral S Lakhia
(74) *Attorney, Agent, or Firm* — Nicholas Park (57) ABSTRACT

The present inventive idea relates to a method for forming a Bluetooth network which authenticates through an authentication code generated based on post-quantum cryptography and a Bluetooth network operating system performing the same. The method for forming a Bluetooth network performed by a master device to perform Bluetooth communication with a slave device according to an embodiment of the present disclosure may include: obtaining an address of the slave device by scanning the Bluetooth network; generating a public key and a private key; transmitting the public key to the scanned slave device; receiving a key capsule and an authentication code corresponding to the public key; generating a verification code by using the key capsule; generating a symmetric key by comparing the verification code with the authentication code; and performing communication through the Bluetooth network by using the symmetric key.

5 Claims, 10 Drawing Sheets

(56) References Cited

U.S. PATENT DOCUMENTS

| | | | |
|---|---|---|---|
| 2020/0349253 A1* | 11/2020 | Maim | G06F 21/71 |
| 2021/0126674 A1* | 4/2021 | Jeon | H04L 9/3271 |
| 2021/0336797 A1* | 10/2021 | Van Duren | H04L 9/3297 |
| 2022/0038269 A1 | 2/2022 | Nix | |
| 2022/0237601 A1* | 7/2022 | Duffy | H04W 12/06 |
| 2022/0240083 A1* | 7/2022 | Goel | H04W 12/069 |
| 2022/0248221 A1* | 8/2022 | Nix | H04L 63/06 |

* cited by examiner

METHOD FOR GENERATING BLUETOOTH NETWORK AUTHENTICATING THROUGH AUTHENTICATION CODE GENERATED BASED ON POST-QUANTUM CRYPTOGRAPHY AND BLUETOOTH NETWORK OPERATING SYSTEM PERFORMING SAME

CROSS-REFERENCE TO RELATED APPLICATION

This application claims priority to and the benefit of Korean Patent Application No. 10-2022-0110909, filed on Sep. 1, 2022, the disclosure of which is incorporated herein by reference in its entirety.

BACKGROUND

Technical Field

The present invention relates to a method for forming a Bluetooth network transmitting and receiving data by forming a Bluetooth network based on post-quantum cryptography, and a Bluetooth network operating system performing the same.

Related Art

Bluetooth is a technology standard for wirelessly connecting portable devices such as portable PCs or mobile phones within a narrow range. Bluetooth supports various digital devices to transmit and receive voice and data without a physical cable by using a radio frequency of an industrial scientific medical (ISM) band of 245 MHZ, for example. For example, a Bluetooth communication module is embedded in a mobile communication terminal and a laptop computer to support wireless communication. Because of this convenience, Bluetooth is used in smartphones, desktops, FAXs, keyboards, or joysticks, as well as almost all digital devices.

Meanwhile, with the development of quantum computers, security of an encryption algorithm used in an existing cryptosystem has been weakened, and accordingly, a need for Post Quantum Cryptography, which is an encryption algorithm in which security is maintained even by a quantum computer, has emerged, and a Bluetooth network also needs to be applied to Post Quantum Cryptography in which security is maintained even by a quantum computer.

SUMMARY

Technical Problem

An object of the present invention is to provide a method for forming a Bluetooth network and a Bluetooth network operating system performing authentication on a slave device by using an authentication code generated using a quantum resistance encryption algorithm in a Bluetooth network forming process.

Technical Solution

A method for forming a Bluetooth network performed by a master device to perform Bluetooth communication with a slave device according to an embodiment of the present disclosure may include the steps of: obtaining an address of the slave device by scanning the Bluetooth network; generating a public key and a private key; transmitting the public key to the scanned slave device; receiving a key capsule and an authentication code corresponding to the public key; generating a verification code by using the key capsule; generating a symmetric key by comparing the verification code with the authentication code; and performing communication through the Bluetooth network by using the symmetric key.

In an embodiment, the key capsule may be generated by sealing a randomly generated key message using the public key.

The authentication code may be generated by hashing a first authentication message and a second authentication message, the first authentication message may be generated by utilizing a key code exchanged by the Bluetooth network, and the second authentication message may be generated by utilizing the key capsule, the address of the slave device, and the address of the master device.

In an embodiment, the step of generating the verification code may include: generating a first verification message using a key code exchanged by the Bluetooth network; generating a second verification message using the key capsule, an address of the slave device, and an address of the master device; and generating the verification code by hashing the first verification message and the second verification message.

In an embodiment, the step of generating the symmetric key may include comparing the verification code with the authentication code, generating the symmetric key using the key capsule when the verification code is equal to the authentication code, and stopping a Bluetooth connection due to a verification failure when the verification code is not equal to the authentication code.

In an embodiment, the step of generating the symmetric key using the key capsule may include extracting a key message by opening the key capsule using the private key, generating a prekey by hashing the key message and the public key, and generating the symmetric key by hashing the key capsule and the prekey.

In an embodiment, the step of generating the public key and the private key may include: defining a key matrix corresponding to a random polynomial ring; sampling a first key vector corresponding to a lattice and a second key vector having a first distance from the first key vector; and generating the public key and the private key using the key matrix, the first key vector, and the second key vector.

According to an embodiment of the present disclosure, a method for forming a Bluetooth network performed by a slave device to perform Bluetooth communication with a master device may include: receiving an address and a public key of the master device from the master device; generating a key capsule using the public key; generating an authentication code using the key capsule and a key code exchanged by the Bluetooth network; generating a symmetric key using the key capsule; and performing communication through the Bluetooth network using the symmetric key.

In an embodiment, the step of generating the key capsule may include: generating a key message using a random number generator; and generating the key capsule by sealing the key message using the public key.

In an embodiment, the step of generating the symmetric key using the key capsule may include: generating a prekey by hashing the key message and the public key; and generating the symmetric key by hashing the prekey and the key capsule.

In an embodiment, the step of generating the authentication code may include generating a first authentication message using a key code exchanged by the Bluetooth network, generating a second authentication message using the key capsule, an address of the slave device, and an address of the master device, and generating the authentication code through a hash for the first authentication message and the second authentication message.

DETAILED DESCRIPTION

Hereinafter, exemplary embodiments of the present disclosure will be described in detail with reference to the accompanying drawings. Advantages and features of the present disclosure and methods of achieving them will become apparent with reference to embodiments described in detail below together with the accompanying drawings. However, the technical spirit of the present invention is not limited to the following embodiments, but may be implemented in various different forms, and the following embodiments are provided to complete the technical spirit of the present invention and to completely inform a person having ordinary skill in the art to which the present invention belongs of the scope of the present invention, and the technical spirit of the present invention is only defined by the scope of Claims.

In adding reference numerals to elements in each drawing, it should be noted that the same elements will be designated by the same reference numerals, if possible, even though they are shown in different drawings. In addition, in describing the present invention, when it is determined that a detailed description of related known configurations or functions may obscure the gist of the present invention, the detailed description thereof will be omitted.

Unless otherwise defined, all terms (including technical and scientific terms) used herein have the same meaning as commonly understood by one of ordinary skill in the art to which the inventive concept belongs. In addition, terms defined in commonly used dictionaries are not interpreted ideally or excessively unless they are clearly specifically defined. The terminology used herein is for the purpose of describing embodiments and is not intended to be limiting of the present invention. In the specification, a singular form includes a plural form unless specifically mentioned in the text.

In addition, in describing components of the present disclosure, terms such as first, second, A, B, (a), (b), and the like may be used. The term is used only to distinguish a component from another component, and the nature, sequence, or order of the corresponding component is not limited by the term. When it is described that a component is "linked", "coupled", or "connected" to another component, the component may be directly connected or connected to the other component, but it should be understood that another component may be "linked", "coupled", or "connected" between the components.

It will be further understood that the terms "comprises" and/or "comprising" used in the present invention do not preclude the presence or addition of one or more other components, steps, operations and/or elements, as mentioned.

Components included in any one embodiment and components including a common function may be described using the same name in another embodiment. Unless stated otherwise, the description described in any one embodiment may be applied to other embodiments, and the detailed description may be omitted within a redundant range or a range that can be obviously understood by a person having ordinary skill in the art.

Hereinafter, some embodiments of the present invention will be described in detail with reference to the accompanying drawings.

Hereinafter, the present invention will be described in detail with reference to preferred embodiments of the present invention and the accompanying drawings.

Figure 1:
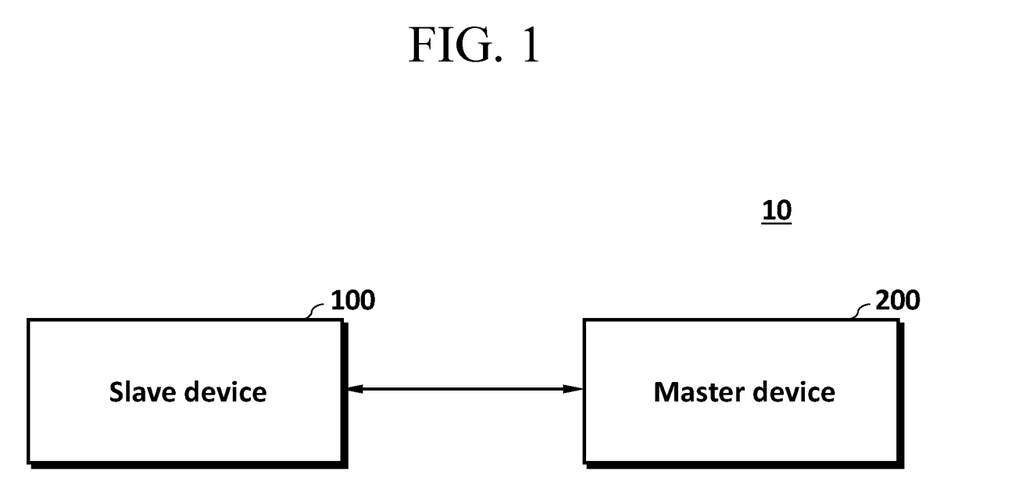
FIG. 1 is a block diagram illustrating a Bluetooth network operating system according to an example embodiment.

FIG. 1 is a block diagram illustrating a Bluetooth network operating system according to an example embodiment;

Referring to FIG. 1, the Bluetooth network operating system 10 may include a slave device 100 and a master device 200. In an embodiment, the slave device 100 and the master device 200 may be devices that desire to communicate with each other through a Bluetooth network, and may include various communication terminals such as a cellular phone, a smart phone, a laptop, a personal computer (PC), a navigation, a personal communication system (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband Internet (Wibro) terminal, a smart pad, a tablet PC, a wireless earphone, a keyboard, a mouse, and the like.

The master device 200 may perform various communications with the slave device 100 by connecting the slave device 100 in the Bluetooth network. In an example, the master device 200 may transmit a control signal to the paired slave device 100 through the Bluetooth network, and the slave device 100 may perform various operations based on the control signal. In another example, the slave device 100 may transmit the data collected by the slave device 100 to the paired master device 200 through the Bluetooth network.

In an embodiment, the slave device 100 may receive at least one key generated based on a lattice from the master device 200, and may perform various operations for the slave device 100 and the master device 200 to form a Bluetooth network by using the at least one key.

In an embodiment, the slave device 100 may generate an authentication code by using the key received from the master device 200, and the master device 200 may perform authentication on the slave device 100 by using the authentication code.

In this specification, the operation of the Bluetooth network operating system 10 and the components included therein may mean an operation performed by a processor included in each component based on a computer program including at least one instruction stored in a storage device included in each component, and the storage device may include a non-volatile memory, a volatile memory, a flash memory, a hard disk drive (HDD), a solid state drive (SSD), or the like. The processor may include at least one of a Central Processing Unit (CPU), a Graphic Processing Unit (GPU), a Neural Processing Unit (NPU), a RAM, a ROM, a system bus, and an application processor.

Figure 2:
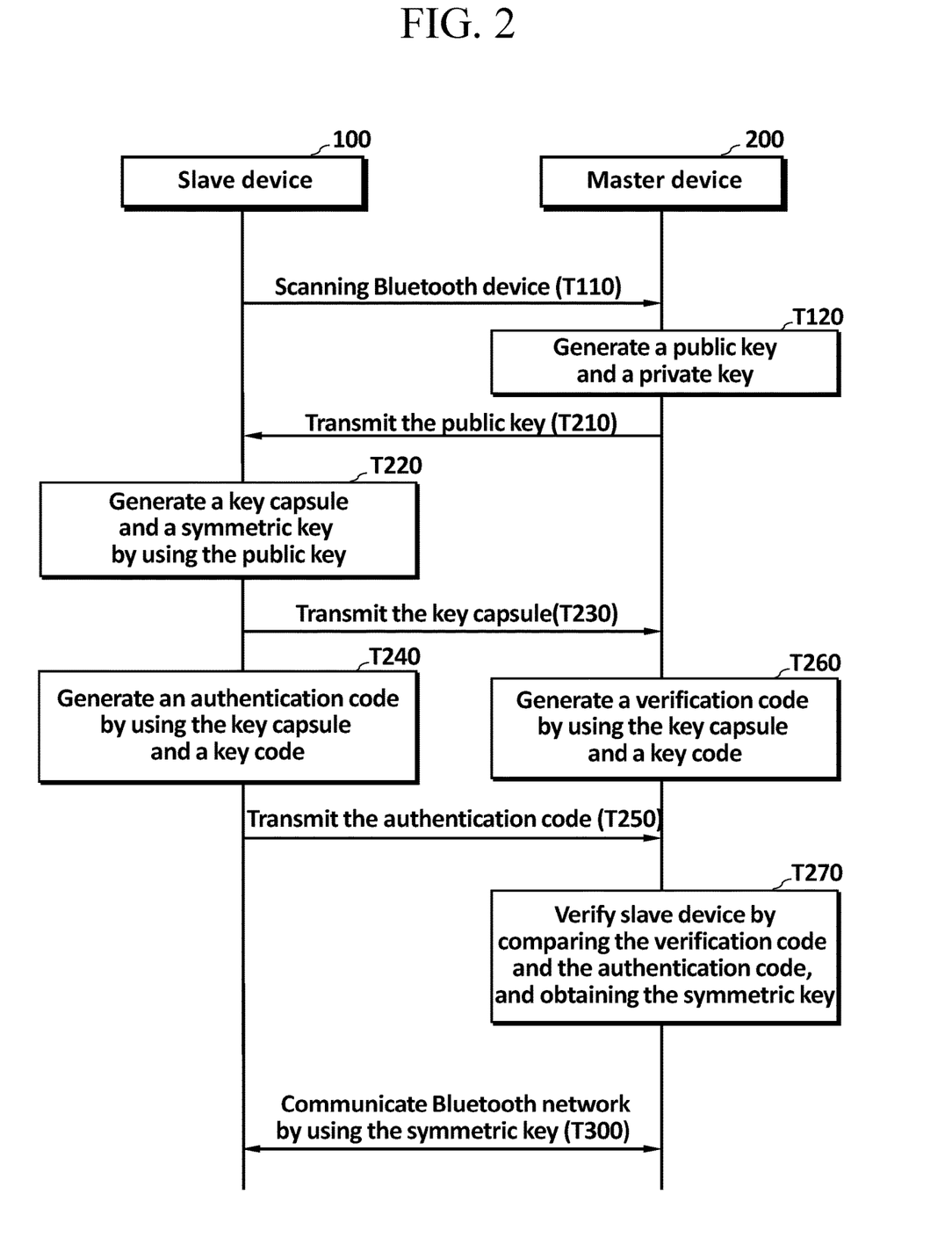
FIG. 2 is a flowchart illustrating a method of operating a Bluetooth network operating system according to an example embodiment.

FIG. 2 is a flowchart illustrating a method of operating a Bluetooth network operating system according to an example embodiment;

Referring to FIG. 2, the master device 200 may discover the slave device 100 by scanning a Bluetooth device in a Bluetooth network T110, and may collect various pieces of information about the slave device 100. In an example, the master device 200 may collect an address (e.g., MAC Address) of the slave device 100 and a key code of a Bluetooth protocol used by the slave device 100.

The master device 200 may generate a public key and a private key for a Bluetooth network connection with the slave device 100 T120. In an embodiment, the master device 200 may generate a public key and a private key by using a lattice-based algorithm, which will be described in detail later with reference to FIGS. 7 to 9.

The master device 200 may transmit the generated public key to the slave device 100 T210. The slave device 100 may generate a key capsule and a symmetric key by using the received public key T220. In the present specification, the sealing refers to an operation of concealing information that does not need to be exposed to the outside by enclosing the information like a capsule by generating a data path that can be accessed only by a subject having a public key by using the public key, and the opening refers to an operation of confirming the sealed information by using the public key or a private key corresponding to the public key. The slave device 100 may generate a key capsule by sealing a key message corresponding to a random value or the like by using a public key, which will be described in detail later with reference to FIG. 3.

The slave device 100 may transmit the generated key capsule to the master device 200 T230, and generate an authentication code by using the generated key capsule and the key code T240. Also, the slave device 100 may transmit the generated authentication code to the master device 200 T250. In an embodiment, the slave device 100 may obtain a key code corresponding to the Bluetooth protocol in advance, and may generate an authentication code by using a key capsule and the key code, thereby generating a sufficiently complex code so that the length of the authentication code is not hacked even in quantum computing. A process in which the slave device generates the authentication code will be described in detail later in FIG. 4.

The master device 200 may generate a verification code by using the key capsule and the key code T260. In an embodiment, the master device 200 may previously obtain a key code corresponding to the Bluetooth protocol, and may accurately verify the authentication code by generating a verification code by using a key capsule and the key code in the same manner as the authentication code. A process in which the master device generates the verification code will be described in detail later with reference to FIG. 6.

The master device 200 may verify the slave device 100 by comparing the authentication code with the verification code, and may generate a symmetric key T270. After the key exchange is completed, the master device 200 and the slave device 100 may perform communication using the Bluetooth network by using the symmetric key T300.

According to the inventive concept, by performing a key exchange using a public key and a private key generated based on a lattice, even when an attacker attacks the key exchange during the key exchange process between the slave device 100 and the master device 200, information on the key may not be leaked.

Also, according to the technical concept of the present disclosure, by generating a symmetric key by transmitting and receiving a key capsule having double security by performing sealing again on a random value, an exchange of the symmetric key may be performed only by transmitting and receiving the key capsule without transmitting and receiving the symmetric key itself. As a result, even though the key capsule is exposed, information on the symmetric key is not exposed and security may be increased as the key exchange is finished.

In addition, according to the inventive concept, an authentication code may be generated by using a key capsule having sufficient complexity and a key code corresponding to a Bluetooth network, and the slave device 100 may be verified through the generated authentication code, thereby determining whether the slave device 100 is a valid slave device sharing the same key code, and accordingly, security of Bluetooth network communication may be increased.

Figure 3:
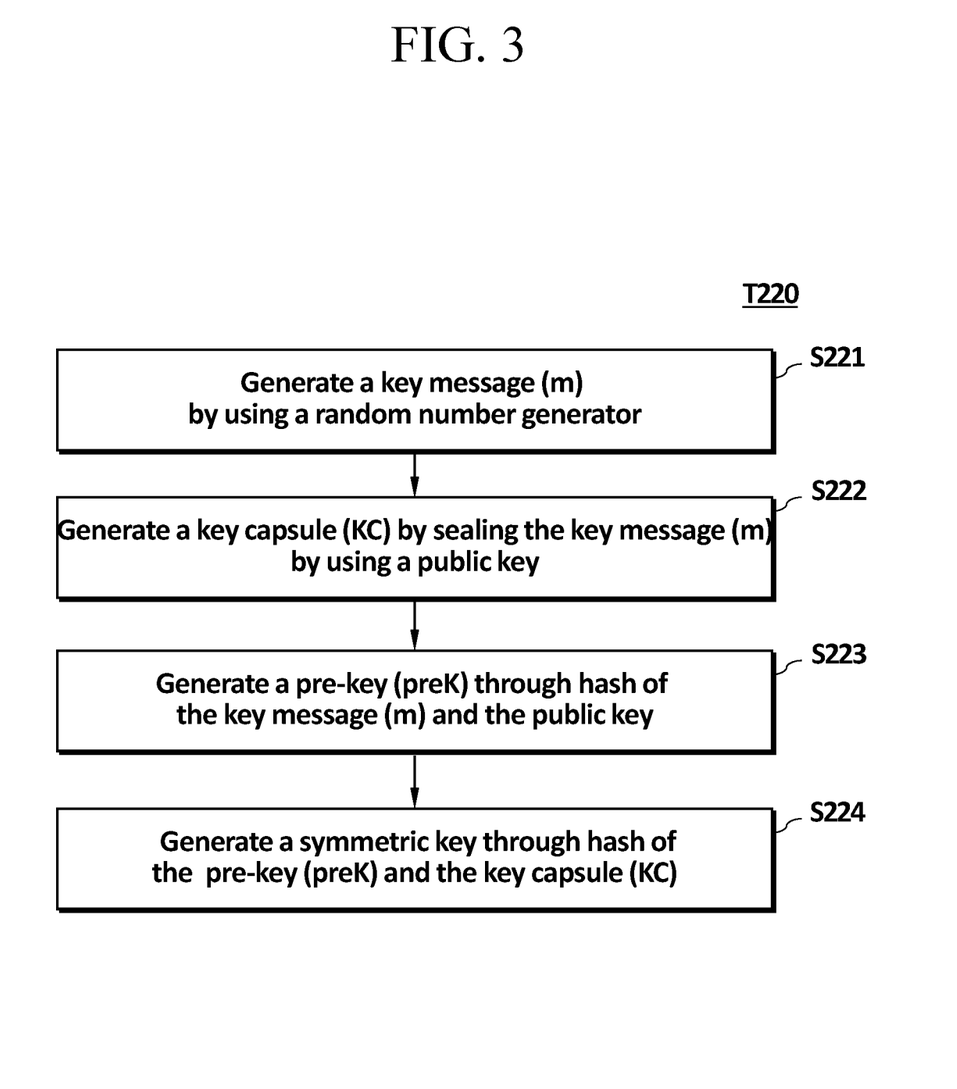
FIG. 3 is a flowchart illustrating a method for forming a Bluetooth network according to an embodiment of the present invention.

FIG. 3 is a flowchart illustrating a method for forming a Bluetooth network according to an example embodiment; In detail, FIG. 3 illustrates the key capsule creating step T220 of the slave device 100 of FIG. 2.

Referring to FIG. 3, the slave device 100 may generate a key message m using a random number generator S221. The random number generator refers to a device for generating a random number or symbol that cannot be theoretically predicted based on entropy, and may include a non-deterministic random bit generator (NRBG) and a deterministic random bit generator (DRBG) according to a noise source to be used. In addition, the key message m is data in which a plurality of bits generated using the random number generator are listed, and may be generated as 256 bit in one example.

The slave device 100 may generate a key capsule KC by sealing the key message m using the public key S222. According to an embodiment of the disclosure, the slave device 100 may seal the key message m generated as a random value by using the public key once again, thereby maximizing the security of the generated key capsule KC.

The slave device 100 may generate a pre-key preK by hashing the key message m generated using the random number generator and the public key S223. The slave device 100 may generate the symmetric key by hashing the pre-key preK and the key capsule KC again S224.

According to an exemplary embodiment of the present disclosure, the slave device 100 may generate the pre-key preK by using the key message m and the public key shared with the master device 200, and may generate the key hash value KH, which is the symmetric key, by using the key capsule KC and the pre-key preK shared with the master device 200, so that even when the key capsule KC is exposed to an attacker using quantum computing in the process of generating the same symmetric key as the master device 200, the symmetric key may not be exposed to the attacker because the symmetric key is generated by using the pre-key preK, which is not exposed to the attacker, together, and stability of key exchange may be increased. In addition, the slave device 100 may generate a symmetric key using a key message of 256 bit or more, thereby generating a secure symmetric key ensuring security despite quantum computing.

Figure 4:
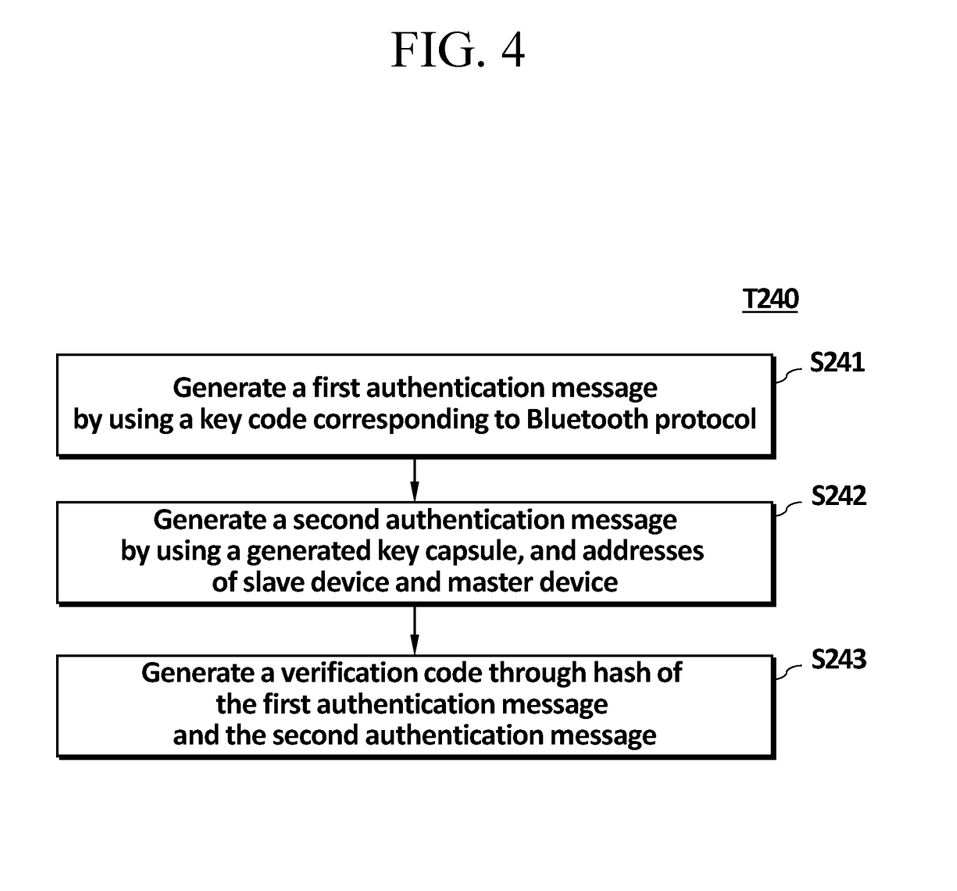
FIG. 4 is a flowchart illustrating a method for forming a Bluetooth network according to an example embodiment.

FIG. 4 is a flowchart illustrating a method for forming a Bluetooth network according to an example embodiment; In detail, FIG. 4 illustrates an authentication code generation method T240 of the slave device 100 of FIG. 2.

Referring to FIG. 4, the slave device 100 may generate a first authentication message using the key code exchanged by the Bluetooth protocol T241. In an embodiment, the slave device 100 may receive the key code corresponding to the Bluetooth protocol through scanning with the master device 200, and generate the first authentication message by substituting the received key code into a message generation function (e.g., a hash function). In one example, the first authentication message may be generated at 256 bit or higher.

The slave device 100 may generate a second authentication message by using the key capsule generated T220, the address (e.g., MAC Address) of the slave device 100, and the address (e.g., MAC Address) of the master device 200 S242. In an embodiment, the slave device 100 may receive the address of the master device 200 through scanning with the master device 200, and may generate the second authentication message by substituting the key capsule, the address (e.g., MAC Address) of the slave device 100, and the address (e.g., MAC Address) of the master device 200 into the message generation function. In one example, the second authentication message may be generated at 256 bit or higher.

The slave device 100 may generate an authentication code by hashing the first authentication message and the second authentication message at operation S243.

According to an embodiment of the disclosure, the slave device 100 may authenticate that it is in a Bluetooth network such as the master device 200 by using the authentication code by generating the authentication code by using a key code that is a unique value of the Bluetooth protocol. According to an exemplary embodiment of the present disclosure, the slave device 100 may generate the authentication code by utilizing the key capsule generated using the quantum resistance algorithm, thereby sufficiently securing the complexity of the authentication code and improving the security in spite of the quantum computing. According to an exemplary embodiment, the slave device 100 may generate an authentication code by using the address of the slave device 100 and the address of the master device 200, thereby authenticating a participant of the Bluetooth network through the authentication code.

Figure 5:
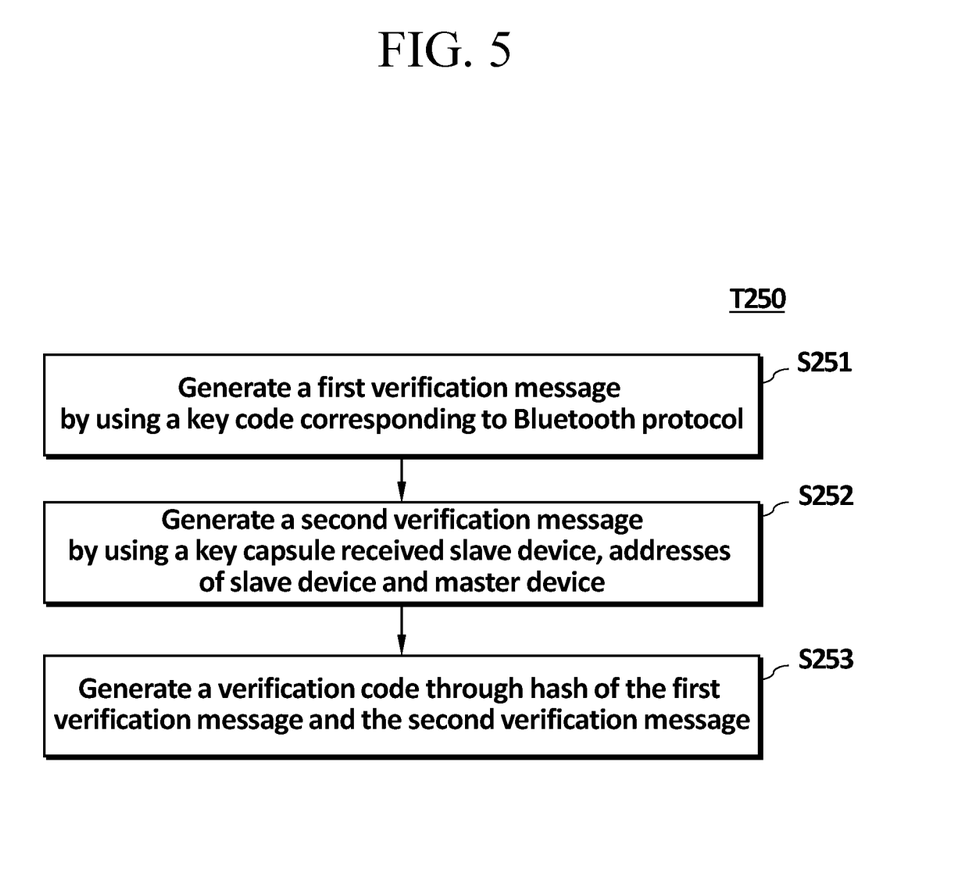
FIG. 5 is a flowchart illustrating a method for forming a Bluetooth network according to an example embodiment.

FIG. 5 is a flowchart illustrating a method for forming a Bluetooth network according to an example embodiment; In detail, FIG. 5 illustrates a verification code generation step T250 of the master device 100 of FIG. 2.

Referring to FIG. 5, the master device 200 may generate a first verification message using the key code exchanged by the Bluetooth protocol T251. In an embodiment, the master device 200 may generate the first verification message by substituting a key code corresponding to the Bluetooth protocol of the master device 200 into a message generation function (e.g., a hash function). In one example, the first authentication message may be generated at 256 bit or higher.

The master device 200 may generate a second verification message by using the key capsule received from the slave device 100 T230, the address (e.g., MAC Address) of the slave device 100, and the address (e.g., MAC Address) of the master device 200 S242) In an embodiment, the master device 200 may receive the address of the slave device 100 through scanning with the slave device 100, and may generate the second verification message by substituting the key capsule, the address of the slave device 100 (e.g., MAC Address), and the address of the master device 200 (e.g., MAC Address) into the message generation function. In one example, the second verification message may be generated to be 256 bit or higher.

The slave device 100 may generate a verification code by hashing the first verification message and the second verification message S243.

According to an exemplary embodiment of the present disclosure, the master device 200 may verify the authentication code generated by using the key code, the key capsule, the address of the slave device 100, and the address of the master device 200, which are unique values of the Bluetooth protocol, by using the verification code generated by the same method, thereby accurately verifying the slave device 100.

Figure 6:
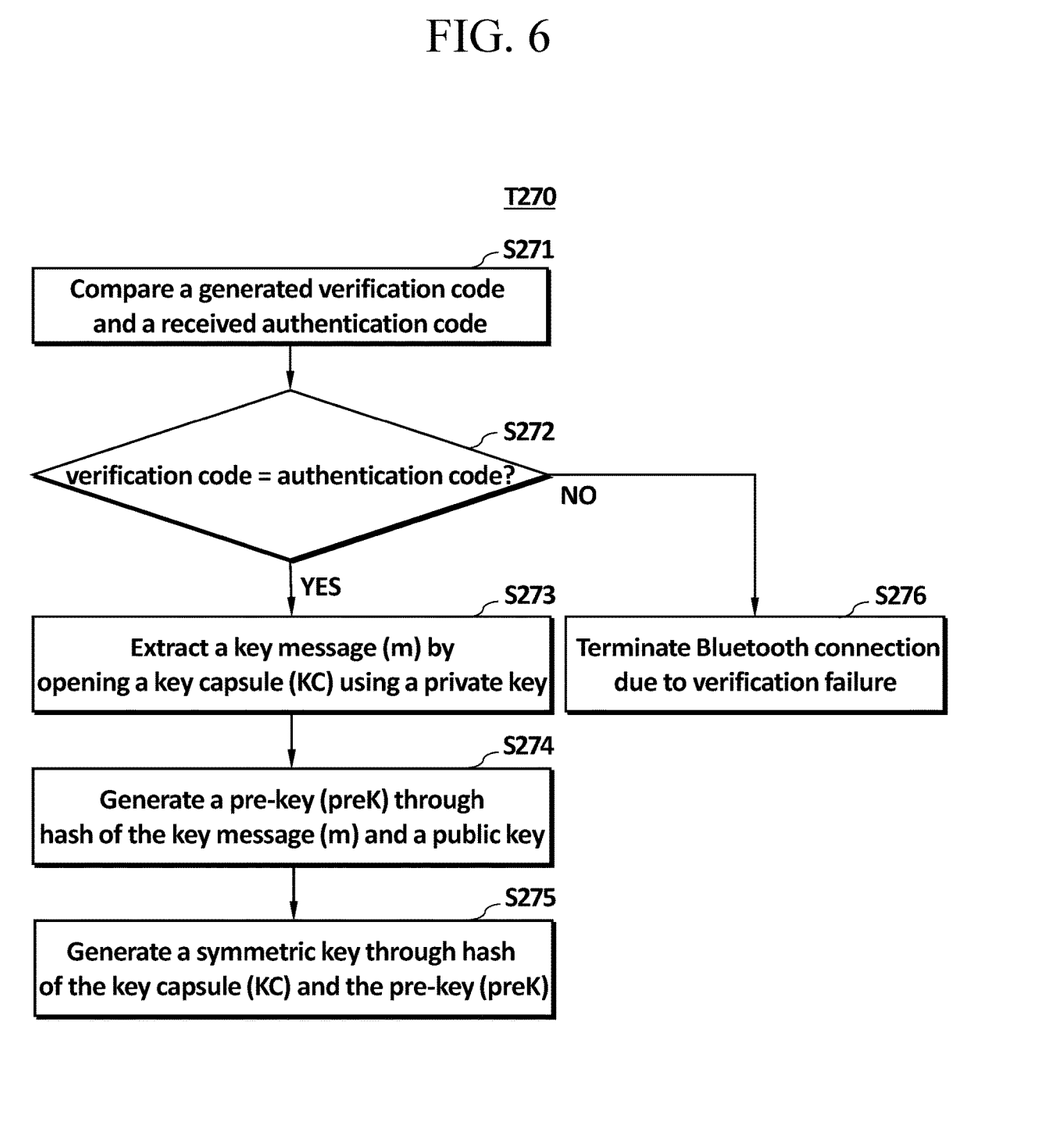
FIG. 6 is a flowchart illustrating a method for forming a Bluetooth network according to an example embodiment.

FIG. 6 is a flowchart illustrating a method for forming a Bluetooth network according to an example embodiment; In detail, FIG. 6 illustrates the step T270 of verifying and obtaining a symmetric key by the master device 100 of FIG. 2.

Referring to FIG. 6, the master device 200 may authenticate the slave device 100 by comparing the generated verification code with the received authentication code S271. When the verification code and the authentication code are the same S272, the master device 200 may generate a symmetric key S273 to S275. When the verification code and the authentication code are the same, it may be guaranteed that the key capsule KC of the slave device 100 is the same as the key capsule KC of the master device 200.

In the symmetric key generation process, the master device 200 may extract the key message m by opening the key capsule KC using the private key S273. Since the key capsule KC is sealed by the public key, the key message m may be normally extracted by using the private key corresponding to the public key. The master device 200 may generate the pre-key preK through the hash for the key message m and the public key S274, and may generate the symmetric key through the hash for the key capsule KC and the pre-key preK S274, in the same manner as the symmetric key generation method of the slave device 100 described above with reference to FIG. 3.

Also, when the verification code is not the same as the authentication code, the master device 200 may terminate the Bluetooth connection due to the verification failure S276.

According to an exemplary embodiment of the present disclosure, the verification is performed on the slave device 100 by using the authentication code and the verification code using the key capsule KC, and thus, the data deformation attack from the attacker may be detected in advance, and the security of the Bluetooth network may be increased.

According to an exemplary embodiment of the present disclosure, even when the key capsule KC is exposed to an attacker using quantum computing in the process of generating the same symmetric key as the slave device 100, the symmetric key may not be exposed to the attacker and the stability of key exchange may be increased because the symmetric key is generated by using the pre-key preK that is not exposed to the attacker.

Figure 7:
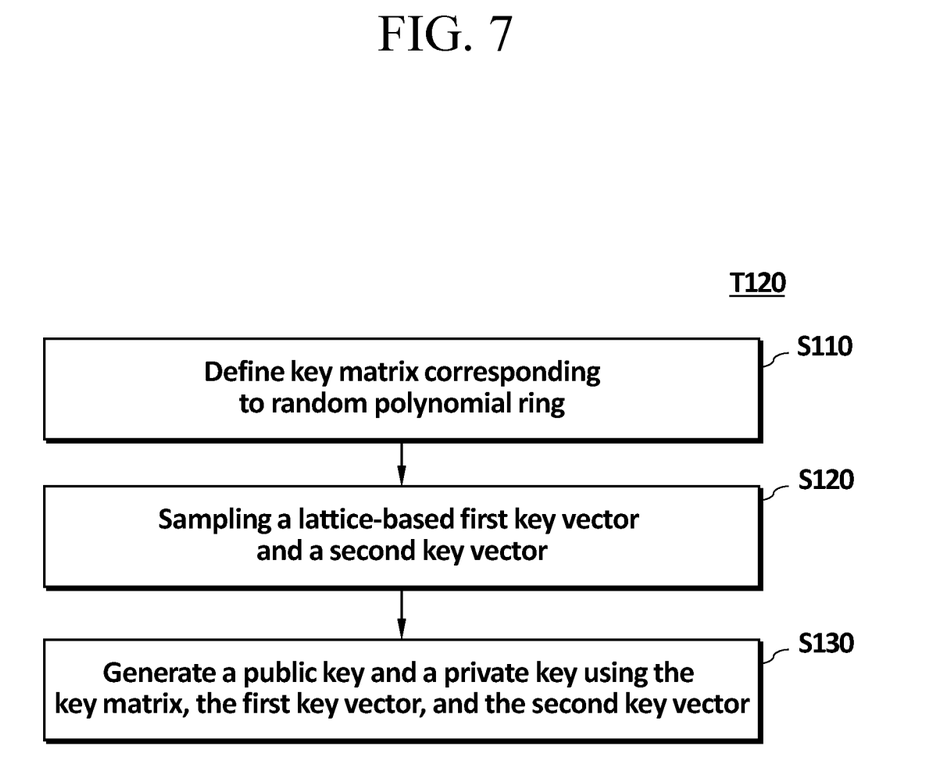
FIG. 7 is a flowchart illustrating a method of generating a quantum resistance key according to an example embodiment.

FIG. 7 is a flowchart illustrating a quantum resistance key generation algorithm according to an example embodiment. In detail, FIG. 7 is a diagram illustrating the key generation method T100 of FIG. 2 in detail.

Referring to FIG. 7, the master device 200 may define a key matrix corresponding to the random polynomial ring S110. The polynomial ring may refer to a ring viewed from an abstract algebraic point of view with respect to a polynomial having a real number and a complex number as coefficients and an unknown number, and the random polynomial ring may refer to a polynomial ring of which coefficients are randomly determined. In addition, the key matrix corresponding to this may mean that the coefficient of the random polynomial ring is represented as a matrix.

The master device 200 may sample the first key vector and the second key vector using a lattice-based algorithm S120. The lattice-based algorithm refers to an encryption algorithm based on mathematical problems on a lattice called a lattice problem, and the lattice problem includes a Shortest Vector Problem (SVP), a Shortest Independent Vectors Problem (SIVP), and a Closest Vector Problem (CVP). The security of the lattice-based algorithm is based on the fact that it is difficult to solve the above-described lattice problem, and since it is difficult to find a lattice point closest to an arbitrary position in a lattice of hundreds of dimensions, if a key is matched to the corresponding lattice point, it is difficult to find a private key corresponding to the position through quantum computing, and thus the lattice-based algorithm may be an alternative. In one example, if any location on the lattice corresponds to a public key and a particular location close to the public key corresponds to a private key, the private key can be hidden at the intersection of the multidimensional lattice, the number of possibilities of shortest vectors for the private key is infinite, and the process of traversing the range of possibilities and the number of permutations in the quantum computer cannot take advantage of the advantages of the quantum computer over the existing computer due to its complex nature. That is, the encryption key may be determined only when the attacker knows his or her own path through the lattice, that is, the attacker has no way to calculate the path, so it may be said that it is theoretically impossible for the attacker to calculate the private key. In an embodiment, a Gaussian distribution method and a dejection sampling method may be used to sample key vectors among a plurality of vectors generated using the lattice-based algorithm.

The master device 200 may generate a public key and a private key using the generated key matrix, the first key vector, and the second key vector S130.

According to the technical idea of the present disclosure, a hacking attempt by quantum computing may be prevented by utilizing a lattice-based algorithm in a process of generating a key for a Bluetooth network, and accordingly, security of the Bluetooth network may be increased.

Figure 8:
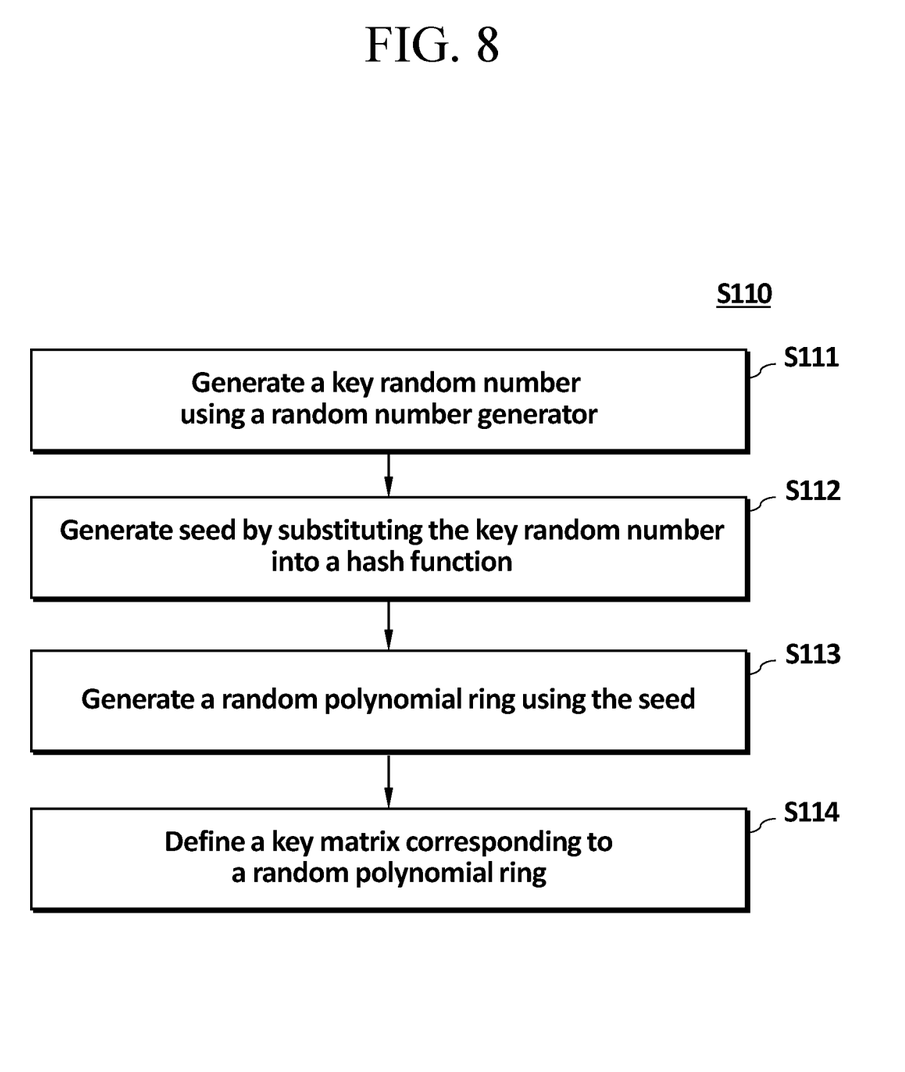
FIG. 8 is a flowchart illustrating a method of generating a quantum resistance key according to an example embodiment.

FIG. 8 is a flowchart illustrating a quantum resistance key generation algorithm according to an example embodiment. In detail, FIG. 8 is a diagram illustrating the key matrix definition step S100 of FIG. 7 in detail.

Referring to FIG. 8, the master device 200 may generate a key random number using a random number generator S111. The master device 200 may generate a seed by substituting the key random number into a hash function S112, and may generate a random polynomial ring using the seed S113. Also, the master device 200 may define a key matrix corresponding to the random polynomial ring S114.

According to an exemplary embodiment of the present disclosure, when defining a key matrix, a random number generator, a hash function, and a random polynomial ring are used to maximize randomness of the key matrix, and as a result, randomness of a key may be maximized.

Figure 9:
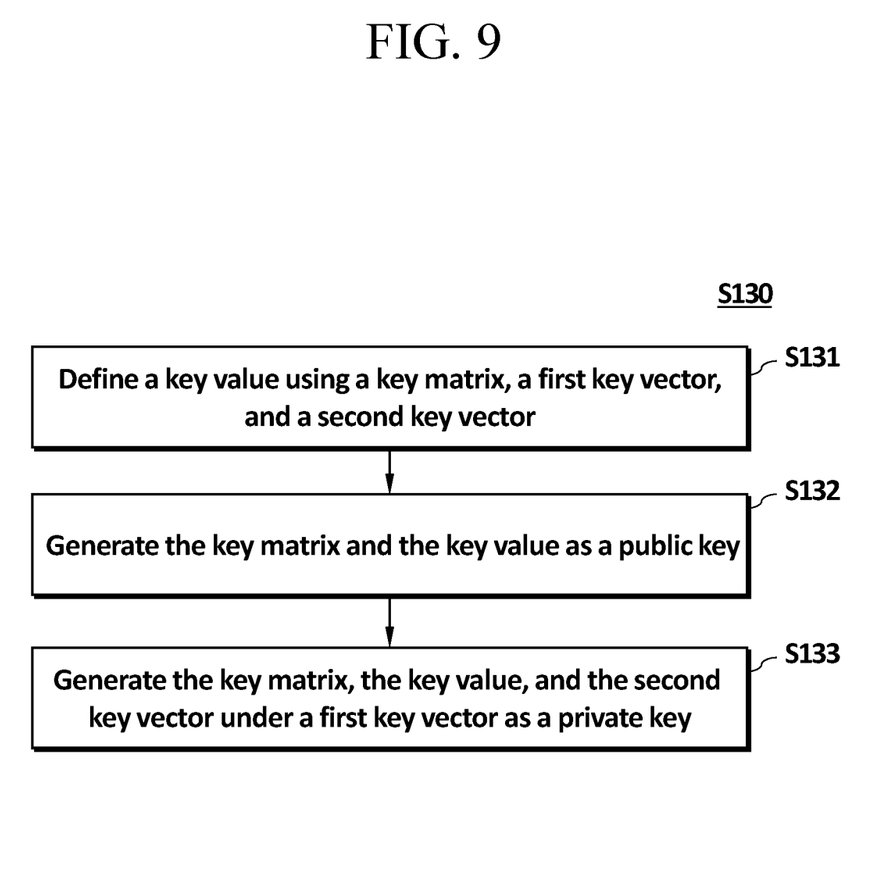
FIG. 9 is a flowchart illustrating a method of generating a quantum resistance key according to an example embodiment.

FIG. 9 is a flowchart illustrating a quantum resistance key generation algorithm according to an example embodiment; In detail, FIG. 9 is a diagram illustrating the step S300 of generating a public key and a private key of FIG. 7 in detail.

Referring to FIG. 9, the master device 200 may define a key value by using a key matrix, a first key vector, and a second key vector S131. In one example, the key value k for the key matrix A, the first key vector v1, and the second key vector v2 may be defined as Equation 1 below.

$$k = A \cdot v1 + v2 \qquad \text{Equation 1}$$

The master device 200 may generate a key matrix and a key value as a public key S132, and may generate a key matrix, a key value, a first key vector, and a second key vector as a private key S133. In one example, the public key pk and the private key sk may be generated as shown in Equation 2 below.

$$pk = (A, k), sk = (A, k, v1, v2) \qquad \text{Equation 2}$$

The master device 200 according to an embodiment of the disclosure may generate a public key and a private key using a key value defined using a lattice-based algorithm, may increase security of the public key by including a key vector in the private key, and may fully decode data using the private key.

Figure 10:
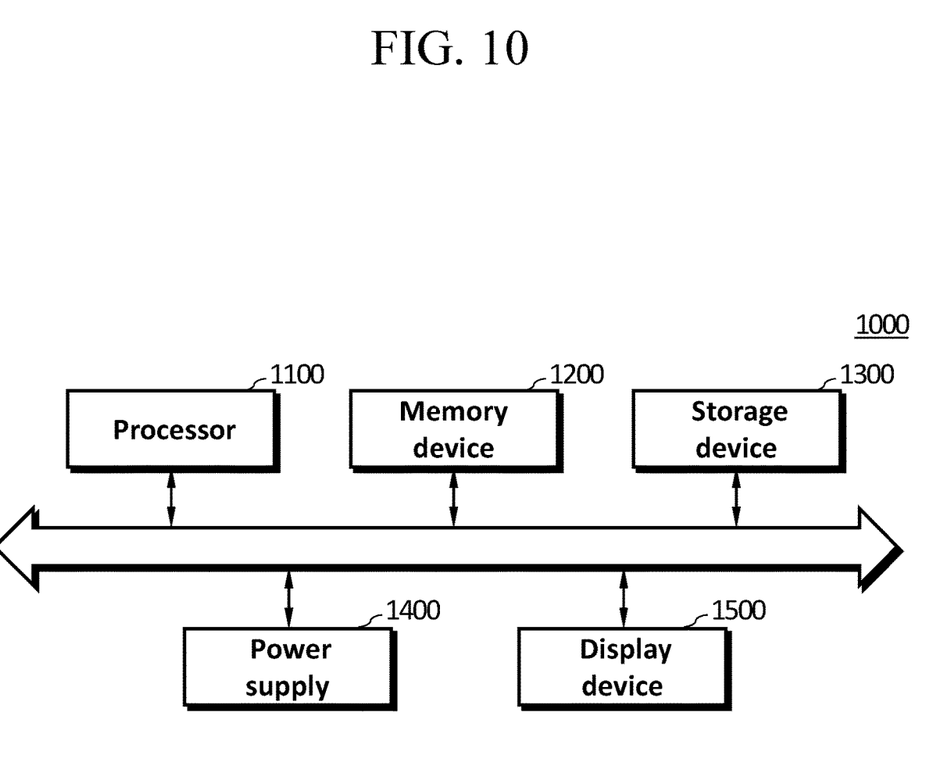
FIG. 10 is a block diagram of a computing system according to an example embodiment.

FIG. 10 is a block diagram of a computing system according to an example embodiment.

Referring to FIG. 10, the computing system 1000 may include any one of a master device 200, a client 200, and a server 300, and may include a processor 1100, a memory device 1200, a storage device 1300, a power supply 1400, and a display device 1500. Although not illustrated in FIG. 10, the computing system 1000 may further include ports for communicating with a video card, a sound card, a memory card, a USB device, other electronic devices, etc.

As described above, the processor 1100, the memory device 1200, the storage device 1300, the power supply 1400, and the display device 1500 included in the computing system 1000 may configure any one of the master device 200, the client 200, and the server 300 according to embodiments of the inventive concept to perform a Bluetooth network forming method. Specifically, the processor 1100 may perform the method of operating the Bluetooth network operating system 10 described above with reference to FIGS. 1 to 9 by controlling the memory device 1200, the storage device 1300, the power supply 1400, and the display device 1500.

The processor 1100 may perform specific calculations or tasks. The processor 1100 may be a micro-processor or a Central Processing Unit (CPU). The processor 1100 may communicate with the memory device 1200, the storage device 1300, and the display device 1500 through a bus 1600 such as an address bus, a control bus, or a data bus. According to an embodiment, the processor 1100 may also be connected to an expansion bus such as a Peripheral Component Interconnect (PCI) bus.

The memory device 1200 may store data necessary for an operation of the computing system 1000. For example, the memory device 1200 may be implemented as a DRAM, a mobile DRAM, an SRAM, a PRAM, an FRAM, an RRAM, and/or an MRAM. The storage device 1300 may include a solid state drive, a hard disk drive, a CD-ROM, etc. The storage device 1300 may store programs, application program data, system data, operating system data, etc., related to the method for forming the Bluetooth network described above with reference to FIGS. 1 to 9.

The display device 1500 may display information about a method for forming a Bluetooth network, which is an output means for performing a notification with respect to a user, to the user, etc. The power supply 1400 may supply an operating voltage required for an operation of the computing system 1000.

According to the technical idea of the present invention, when authentication of a slave device is performed in a process of performing initial setting to provide a Bluetooth network, an authentication code generated by using a quantum resistance encryption algorithm is used to have high security, thereby providing a safe Bluetooth network which is not hacked even in a quantum computer.

Exemplary embodiments have been invented in the drawings and specification as described above. Although embodiments have been described using specific terms in the present specification, they are used only for the purpose of describing the technical spirit of the present invention and are not used to limit the meaning or limit the scope of the present invention described in claims. Therefore, it will be understood by those of ordinary skill in the art that various modifications and other equivalent embodiments are possible therefrom. Therefore, the true technical protection scope of the present invention should be determined by the technical spirit of the appended claims.

What is claimed is:

1. A method for forming a Bluetooth network performed by a master device which includes a processor to perform Bluetooth communication with a slave device comprising:
   obtaining, by the processor, address of the slave device by scanning the Bluetooth network;
   generating, by the processor, a public key and a private key;
   transmitting, by the processor, the public key to the scanned slave device;
   receiving, by the processor, a key capsule and an authentication code corresponding to the public key;
   generating, by the processor, a verification code by using the key capsule;
   generating, by the processor, a symmetric key by comparing the verification code and authentication code; and
   performing, by the processor, communication through the Bluetooth network by using the symmetric key, by the processor,
   wherein the authentication code is generated through hash for a first authentication message and a second authentication message,
   wherein the first authentication message is generated by using a key code exchanged by a protocol corresponding to the Bluetooth network,
   wherein the generating the symmetric key comprises the steps of:
   comparing, by the processor, the verification code and the authentication code;
   generating, by the processor, the symmetric key by using the key capsule if the verification code and the authentication code are the same; and
   terminating, by the processor, the Bluetooth connection by verification failure if the verification code and the authentication code are not the same,
   wherein the generating the symmetric key by using the key capsule comprises the steps of:
   extracting, by the processor, a key message by opening the key capsule by using the private key;
   generating, by the processor, prekey through hash for the key message and the public key; and
   generating, by the processor, a symmetric key through hash for the key capsule and prekey, by the processor,
   wherein the step of generating public key and private key comprises the steps of:
   defining, by the processor, key matrix corresponding to random polynomial ring;
   sampling, by the processor, a first key vector generated by lattice-based algorithm and a second key vector having a first distance to the first key vector; and
   generating, by the processor, the public key and the private key by using the first key vector and the second key vector.

2. The method for forming a Bluetooth network of claim 1, wherein the key capsule is generated by capsuing a randomly generated key message with the public key.

3. The method for forming a Bluetooth network of claim 1, wherein the step of generating the verification code comprises:
   generating, by the processor, a first verification message by utilizing a key code exchanged by a protocol corresponding to the Bluetooth network;
   generating, by the processor, a second verification message by utilizing the key capsule, an address of the slave device, and an address of the master device; and
   generating, by the processor, the verification code through hashing for the first verification message and the second verification message.

4. A method for forming a Bluetooth network performed by a slave device comprising a processor to perform Bluetooth communication with a master device comprising the steps of:
   receiving, by the processor, public key generated by using a first key vector generated by address of the master device and lattice-based algorithm and a second key vector having a first distance to the first key vector, from the master device;
   generating, by the processor, a key capsule by using the public key;
   generating, by the processor, authentication code by using a key code exchanged by a protocol corresponding to the key capsule and the Bluetooth network;
   generating, by the processor, a symmetric key by using the key capsule; and
   performing, by the processor, communication through a Bluetooth network by using the symmetric key, by the processor,
   wherein the step of symmetric key by using the key capsule comprises the steps of:
   generating, by the processor, prekey through hash for a key message and the public key; and
   hashing, by the processor, the prekey and the key capsule to generating them as the symmetric key, by the processor,
   wherein the generating the authentication code comprises the steps of:
   generating, by the processor, a first authentication message by using key code exchanged by a protocol corresponding to the Bluetooth network;
   generating, by the processor, a second authentication message by using the key capsule, and addresses of the slave device and master device; and generating, by the processor, the authentication code through the first authentication message and the second authentication message.

5. The method for forming a Bluetooth network of claim 4, wherein the generating the key capsule comprises:
generating, by the processor, the key message using a random number generator; and
generating, by the processor, the key capsule by capsuling the key message using the public key.

* * * * *